(12) United States Patent
Takahashi et al.

(10) Patent No.: US 11,742,929 B2
(45) Date of Patent: Aug. 29, 2023

(54) USER EQUIPMENT AND COMMUNICATION METHOD

(71) Applicant: NTT DOCOMO, INC., Tokyo (JP)

(72) Inventors: Hideaki Takahashi, Tokyo (JP); Akihito Hanaki, Tokyo (JP); Hidekazu Shimodaira, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 218 days.

(21) Appl. No.: 17/428,468

(22) PCT Filed: Feb. 25, 2019

(86) PCT No.: PCT/JP2019/007141
§ 371 (c)(1),
(2) Date: Aug. 4, 2021

(87) PCT Pub. No.: WO2020/174549
PCT Pub. Date: Sep. 3, 2020

(65) Prior Publication Data
US 2022/0103240 A1     Mar. 31, 2022

(51) Int. Cl.
*H04B 7/08* (2006.01)
*H04B 7/06* (2006.01)
(Continued)

(52) U.S. Cl.
CPC ......... *H04B 7/0868* (2013.01); *H04B 7/0634* (2013.01); *H04W 72/0453* (2013.01); *H04W 72/21* (2023.01); *H04B 7/0413* (2013.01)

(58) Field of Classification Search
CPC .. H04B 7/0868; H04B 7/0634; H04B 7/0413; H04B 7/063; H04W 72/0453; H04W 72/21
See application file for complete search history.

(56) References Cited

U.S. PATENT DOCUMENTS

2017/0171739 A1*   6/2017   Suzuki ................. H04W 28/04
2019/0394687 A1*  12/2019   Kowalski .......... H04W 36/0061

FOREIGN PATENT DOCUMENTS

WO    WO-2017006882 A1 *  1/2017  ........... H04B 7/0486

OTHER PUBLICATIONS

Machine translation for CN-108432276-A. (Year: 2023).*
(Continued)

*Primary Examiner* — Jean B Corrielus
(74) *Attorney, Agent, or Firm* — Osha Bergman Watanabe & Burton LLP (57) ABSTRACT

A user equipment includes a transmission unit that transmits, to a base station, information indicating a specific band combination supported by the user equipment for carrier aggregation and combinations of maximum numbers of Multiple-input and multiple-output (MIMO) layers to be applied to respective component carriers of frequency bands included in the specific band combination, the combinations of the maximum numbers of MIMO layers being supported by the user equipment; and a control unit that applies a default value as the maximum numbers of MIMO layers to be applied, by the user equipment, to the respective component carriers of the frequency bands included in the specific band combination, when a signal indicating the maximum numbers of MIMO layers to be applied, by the base station, to the respective component carriers of the frequency bands included in the specific band combination is not received from the base station.

5 Claims, 4 Drawing Sheets

(51) Int. Cl.
  *H04W 72/0453* (2023.01)
  *H04W 72/21* (2023.01)
  *H04B 7/0413* (2017.01)

(56) References Cited

OTHER PUBLICATIONS

Machine translation for CN-108353272-A (Year: 2023).*
Machine translation for WO-2020170403-A1 (Year: 2923).*
Machine translation for JP-2017005665-A (Year: 2023).*
International Search Report issued in PCT/JP2019/007141 dated May 28, 2019 (4 pages).
Written Opinion of the International Searching Authority issued in PCT/JP2019/007141 dated May 28, 2019 (3 pages).
MediaTek Inc.; "Per serving cell MIMO layer configuration"; 3GPP TSG-RAN WG2 #104, R2-1819086; Spokane, USA; Nov. 12-16, 2018 (5 pages).
Huawei, HiSilicon; "Corrections on maxMIMO-Layers in PDSCH-ServingCellConfig and PUSCH-ServingCellConfig"; 3GPP TSG-RAN WG2 Meeting#105, R2-1901992; Athens, Greece; Feb. 25-Mar. 1, 2019 (5 pages).

* cited by examiner

USER EQUIPMENT AND COMMUNICATION METHOD

TECHNICAL FIELD

The present invention relates to a user equipment and a communication method in a radio communication system.

BACKGROUND ART

A user equipment that supports carrier aggregation (CA) usually supports a plurality of CA band combinations, as combinations of frequency bands applied to the CA (CA band combinations). It has been known that, for component carriers (CCs) included in a specific band combination for CA, a user equipment may support a plurality of numbers of MIMO layers. For example, it is described in Non-Patent Document 1 that the user equipment transmits, to the base station, a notification of the following band combination for the CA and the combinations of the numbers of MIMO layers supported by the user equipment.

Band combination: 1 CC (CC0) on the frequency band A+1 CC (CC1) on the frequency band B+1 CC (CC2) on the frequency band C.

Combination 1 of the numbers of MIMO layers: 4 layers on CC0+4 layers on CC1+2 layers on CC2.

Combination 2 of the numbers of MIMO layers: 4 layers on CC0+2 layers on CC1+4 layers on CC2.

Combination 3 of the numbers of MIMO layers: 2 layers on CC0+4 layers on CC1+4 layers on CC2.

In this case, for example, if the base station attempts to configure the combination 1 of the number of MIMO layers, and if the base station does not explicitly transmit a notification of the combination of the numbers of MIMO layers to be configured by the base station, the user equipment is unable to determine to which CC of CC0, CC1, and CC2, 2 layers are to be applied. As a solution to this problem, an agreement in the 3GPP working group has been obtained for transmitting, from the base station to the user equipment, a notification of the maximum numbers of MIMO layers to be applied to respective component carriers in the base station, and it is reflected in the 3GPP standard.

RELATED ART DOCUMENT

Non-Patent Document

Non-Patent Document 1: 3GPP TSG-RAN WG2 #104, R2-1819086, Spokane, USA, 12-16 Nov. 2018
Non-Patent Document 2: 3GPP TSG-RAN WG2 Meeting #105, R2-1901992, Athens, Greece, 25 Feb.-1 Mar. 2019

SUMMARY OF THE INVENTION

Problem to be Solved by the Invention

When a base station does not transmit, to a user equipment, the maximum numbers of MIMO layers to be applied to respective component carriers, in a case of assuming transmission from the base station, to the user equipment, of a notification of the numbers of MIMO layers to be applied to the respective component carriers, no method has been defined in a current specification document as to how the user equipment configures the maximum numbers of MIMO layers to be applied to the respective CCs. There is a need for a technique with which the user equipment can operate appropriately, when the base station does not transmit, to the user equipment, a notification of the maximum numbers of MIMO layers to be applied to the respective component carriers.

Means for Solving the Problem

According to an aspect of the present invention, there is provided a user equipment including a transmission unit that transmits, to a base station, information indicating a specific band combination supported by the user equipment for carrier aggregation and combinations of maximum numbers of Multiple-input and multiple-output (MIMO) layers to be applied to respective component carriers of frequency bands included in the specific band combination, the combinations of the maximum numbers of MIMO layers being supported by the user equipment; and a control unit that applies a default value as the maximum numbers of MIMO layers to be applied, by the user equipment, to the respective component carriers of the frequency bands included in the specific band combination, when a signal indicating the maximum numbers of MIMO layers to be applied, by the base station, to the respective component carriers of the frequency bands included in the specific band combination is not received from the base station.

Advantage of the Invention

According to an embodiment, a technique is provided with which a user equipment can appropriately operate, even if a base station does not transmit, to the user equipment, the maximum numbers of MIMO layers to be applied to respective component carriers.

EMBODIMENTS OF THE INVENTION

In the following, embodiments of the present invention are described with reference to the drawings. The embodiments described below are only one example, and embodiments to which the present invention is applied are not limited to the following embodiments.

A radio communication system according to the following embodiments is assumed to basically conform to New Radio (NR). However, this is an example, and the radio communication system according to the embodiments may conform to a radio communication system other than NR (e.g., LTE, LTE-A) in whole or in part.

Overall System Configuration

Figure 1:
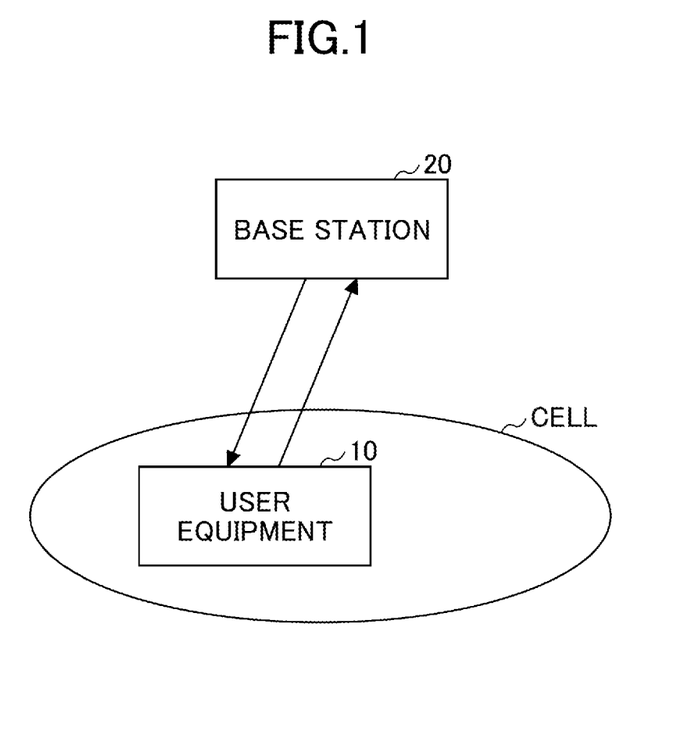
FIG. 1 is a diagram illustrating a configuration of a communication system according to an embodiment.

FIG. 1 illustrates a configuration diagram of a radio communication system according to an embodiment. The radio communication system according to the embodiment includes a user equipment 10 and a base station 20, as illustrated in FIG. 1. In FIG. 1, one user equipment 10 and one base station 20 are illustrated. However, this is an example, and there may be a plurality of user equipments 10 and a plurality of base stations 20.

The user equipment 10 is a communication device having a radio communication function, such as a smartphone, a cellular phone, a tablet, a wearable terminal, and a communication module for M2M (Machine-to-Machine). The user equipment 10 wirelessly connects to the base station 20 and utilizes various communication services provided by the radio communication system. The base station 20 is a communication device that provides one or more cells and wirelessly communicates with the user equipment 10.

In this embodiment, a duplex method may be a Time Division Duplex (TDD) method or a Frequency Division Duplex (FDD) method.

As described in Non-Patent Document 1, when carrier aggregation (CA) is configured, currently, there is no explicit transmission of a notification of the maximum number of multiple-input and multiple output (MIMO) layers of a Physical Downlink Shared Channel (PDSCH)/a Physical Uplink Shared Channel (PUSCH) for each component carrier (CC) from the base station 20 to the user equipment 10.

It has been identified that, when CA is configured, if the base station 20 does not transmit, to the user equipment 10, a notification of numbers of MIMO layers to be set for respective CCs after the base station 20 receives, from the user equipment 10, a notification of a band combination related to the CA and a combination of numbers of MIMO layers supported by the user equipment 10, the user equipment 10 may be unable to appropriately perform setting corresponding to the numbers of MIMO layers set by the base station 20.

As a specific example, the following case can be considered. First, the user equipment 10 transmits, to the base station 20, a notification of the following band combination related to CA and the combinations of numbers of MIMO layers supported by the user equipment 10.

Band combination: 1 CC (CC0) on a frequency band A+1 CC (CC1) on a frequency band B+1 CC (CC2) on a frequency band C.

Combination 1 of numbers of MIMO layers: 4 layers on CC0+4 layers on CC1+2 layers on CC2

Combination 2 of numbers of MIMO layers: 4 layers on CC0+2 layers on CC1+4 layers on CC2

Combination 3 of numbers of MIMO layers: 2 layers on CC0+4 layers on CC1+4 layers on CC2

In this case, for example, if the base station 20 attempts to configure the combination 1 of the numbers of MIMO layers, and if the base station 20 does not transmit, to the user equipment 10, a notification of the combination of the numbers of MIMO layers to be configured by the base station 20, the user equipment 10 is unable to determine CC among CC0, CC1, and CC2, to which two layers are to be applied.

As a solution to this problem, it can be considered that the base station 20 transmits, to the user equipment 10, a notification of maximum numbers of MIMO layers to be applied to respective component carriers. With regard to this solution, an agreement in the 3GPP working group has been reached, and this solution is reflected in the 3GPP standard.

Problem

As described above, agreement has been reached with respect to a transmission of a notification of maximum numbers of MIMO layers to be applied to respective component carriers from the base station 20 to the user equipment 10. However, for example, in a current condition, there may be a case in which, while a function for transmitting a notification of maximum numbers of MIMO layers to be applied to respective component carriers is not implemented in the existing base station 20, a function for receiving the notification of the maximum numbers of MIMO layers to be applied to the respective component carriers is implemented in the user equipment 10. In this case, for example, when CA is to be configured, the base station 20 does not signal the maximum numbers of MIMO layers to be applied to the respective CCs. When the base station 20 does not signal, to the user equipment 10, the maximum number of MIMO layers to be applied to the respective CCs, how the user equipment 10 configures the maximum numbers of MIMO layers to be applied to respective CCs is not currently defined in the technical specification documents.

As a solution to the above-described problem, it has been proposed that, when maximum numbers of MIMO layers to be applied to respective CCs are not signalled from the base station 20 to the user equipment 10, as the maximum numbers of MIMO layers to be applied to the respective CCs, the user equipment 10 assumes a minimum of 4 layers, in conjunction with assuming the maximum number of MIMO layers to be applied to the serving cell, i.e., to the CC, is to be the maximum number of layers for PDSCH supported by the user equipment 10 (Non-Patent Document 2).

However, with regard to a configuration in which the user equipment 10 supports four-layer MIMO by default for all serving cells, that is, all CCs, the configuration leads to an operation close to the limit of the capability of the user equipment 10, and thus it cannot be said that the operation is a technically appropriate operation. In addition, it cannot be said that a configuration in which the user equipment 10 sets four-layer MIMO by default with respect to all CCs is appropriate from the perspective of reducing power consumption of the user equipment 10.

The suggestion that the maximum number of MIMO layers to be applied to each CC is to be the maximum number of layers for PDSCH supported by the user equipment 10 is considered not to be a solution for the above-described problem. In the above-described problem, it is assumed that the base station 20 does not signal the maximum numbers of MIMO layers to be applied to respective CCs. Accordingly, the maximum number of layers for PDSCH supported by the user equipment 10 is unclear in this case, and, thus, the user equipment 10 may be unable to operate appropriately.

Solution 1

In the following, an example of Solution 1 to the above-described problem is described.

It is assumed that the user equipment 10 has, for a specific band combination for CA, a plurality of combinations of the supported numbers of MIMO layers. In this case, the user equipment 10 transmits, to the base station 20, a notification of a specific band combination for the CA and combinations of numbers of MIMO layers supported by the user equipment 10. Subsequently, if the maximum numbers of MIMO layers to be applied to respective CCs are not signalled from the base station 20 to the user equipment 10, the user equipment 10 configures, for each CC, the minimum number of MIMO layers from among the maximum numbers of MIMO layers configured for the CC in the combinations of the supported numbers of MIMO layers, as the maximum number of MIMO layers configured for the CC.

Operation Example 1

Figure 2:
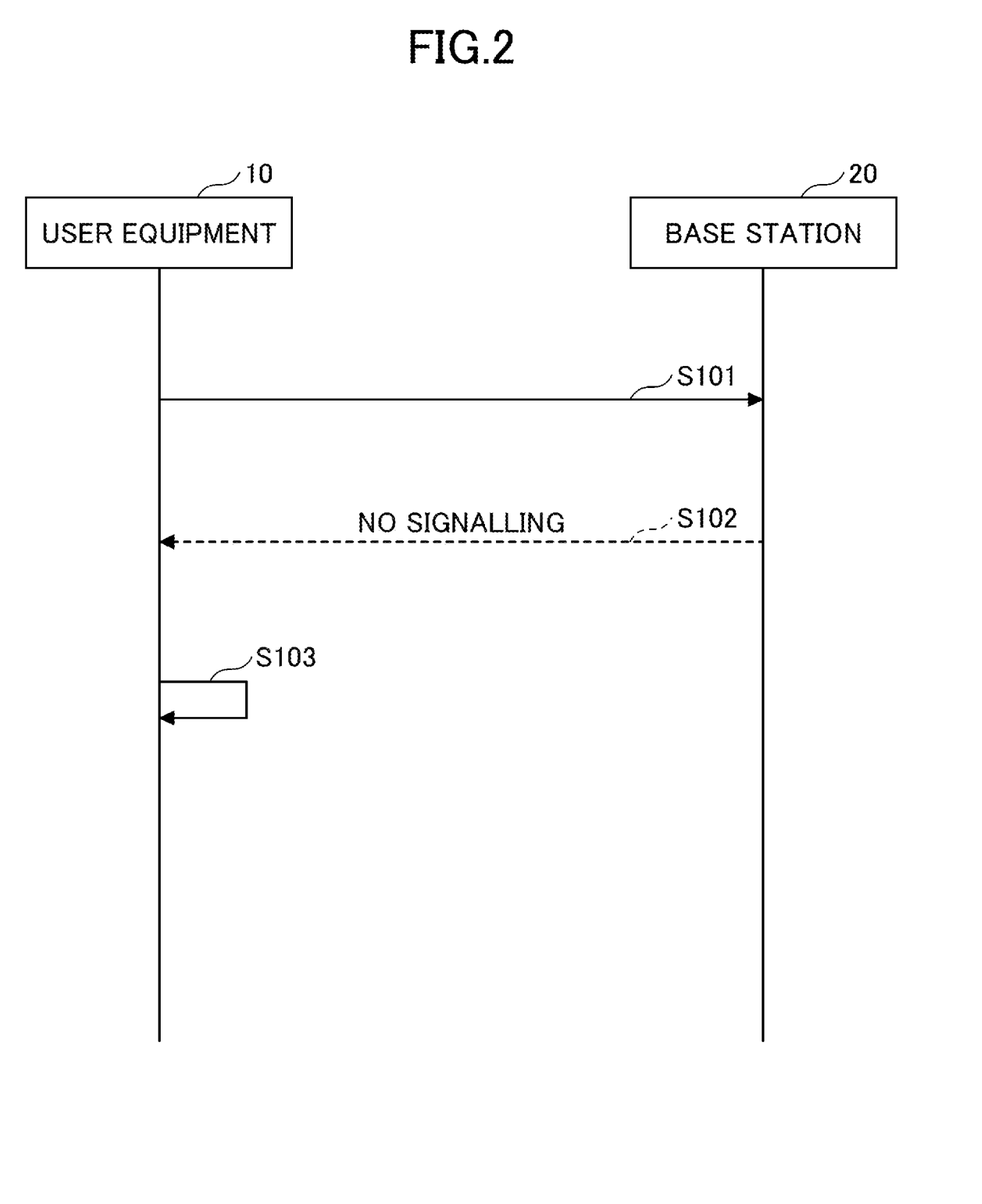
FIG. 2 is a sequence diagram illustrating an operation example 1.

An operation example of Solution 1 is described with reference to FIG. 2.

First, the user equipment 10 transmits, to the base station 20, a notification of the following band combination for the CA and combinations of the numbers of MIMO layers supported by the user equipment 10 (step S101).

Band combination: 1 CC (CC0) on a frequency band A+1 CC (CC1) on a frequency band B+1 CC (CC2) on a frequency band C Combination 1 of the numbers of MIMO layers: four layers on CC0+four layers on CC1+two layers on CC2

Combination 2 of the numbers of MIMO layers: four layers on CC0+two layers on CC1+four layers on CC2

Combination 3 of the numbers of MIMO layers: two layers on CC0+four layers on CC1+four layers on CC2

However, at step S102, the base station 20 does not signal the maximum numbers of MIMO layers to be applied to respective CCs. As a reason for not signalling, by the base station 20, the maximum numbers of MIMO layers to be applied to respective CCs, for example, it can be considered that a function for signalling the maximum numbers of MIMO layers to be applied to respective CCs is not implemented in the base station 20.

After transmitting the notification at step S101, the user equipment 10 waits for signalling of the maximum numbers of MIMO layers to be applied to the respective CCs from the base station 20. In response to not receiving signalling of the maximum numbers of MIMO layers to be applied to respective CCs from the base station 20 even after a predetermined time period elapses from the notification at step S101, the user equipment 10 configures, as the maximum number of MIMO layers configured for a CC of the CCs, the minimum number of MIMO layers from among the maximum numbers of MIMO layers configured for the CC in the combinations of the supported numbers of MIMO layers (step S103).

Specifically, for CC0, 4 layers are configured in the combination 1 of the numbers of MIMO layers, 4 layers are configured in the combination 2 of the numbers of MIMO layers, and 2 layers are configured in the combination 3 of the numbers of MIMO layers. Accordingly, the user equipment 10 configures 2 layers as the maximum number of MIMO layers to be applied to CC0. For CC1, 4 layers are configured in the combination 1 of the numbers of MIMO layers, 2 layers are configured in the combination 2 of the numbers of MIMO layers, and 4 layers are configured in the combination 3 of the numbers of MIMO layers. Accordingly, the user equipment 10 configures 2 layers as the maximum number of MIMO layers to be applied to CC1. For CC2, 2 layers are configured in the combination 1 of the numbers of MIMO layers, 4 layers are configured in the combination 2 of the numbers of MIMO layers, and 4 layers are configured in the combination 3 of the numbers of MIMO layers. Accordingly, the user equipment 10 configures 2 layers as the maximum number of MIMO layers to be applied to CC2.

As described above, according to solution 1, when the base station 20 does not signal the maximum numbers of MIMO layers to be applied to respective CCs, the user equipment 10 can configure, for each CC, the minimum number of MIMO layers from among the supported numbers of MIMO layers, as the default value. Accordingly, the amount of power consumption in the user equipment 10 can be reduced. Here, as another operation in a case in which the user equipment 10 fails to receive signalling of the maximum numbers of MIMO layers to be applied to respective CCs from the base station 20, an operation has been specified in which the user equipment 10 determines that an RRC Reconfiguration failure occurs and the user equipment 10 performs processing of reconnection to the base station 20. However, in this operation, the user equipment 10 performs processing of reconnection, and, thus, the communication between the user equipment 10 and the base station 20 is disconnected temporarily. In contrast, according to the solution 1, the communication between the user equipment 10 and the base station 20 can be prevented from being disconnected.

Solution 2

In the above-described solution 1, when the maximum numbers of MIMO layers to be applied to respective CCs are not signalled from the base station 20 to the user equipment 10, the user equipment 10 configures, for each CC, the minimum number of MIMO layers from among the numbers of MIMO layers configured for the CC in the combinations of the supported numbers of MIMO layers, as the maximum number of MIMO layers to be configured for the CC. In the solution 2, when the maximum numbers of MIMO layers to be applied to the respective CCs are not signalled from the base station 20 to the user equipment 10, the user equipment 10 sets the maximum number of MIMO layers to be configured for each CC to 1 layer. An operation example of the solution 2 is the same as the operation example illustrated in FIG. 2. Specifically, at step S103, the user equipment 10 sets the maximum number of MIMO layers configured for each CC to 1 layer.

As described above, according to the modified example, when the base station 20 does not signal the maximum numbers of MIMO layers to be applied to the respective CCs, the user equipment 10 can configure 1 layer, as the default value of the maximum MIMO layers to be configured for each CC. Accordingly, the amount of power consumption can be reduced. Furthermore, in the solution 2, the user equipment 10 does not perform the processing of reconnection. Thus, the communication between the user equipment 10 and the base station 20 can be prevented from being disconnected.

Device Configuration

Next, a functional configuration example of the user equipment 10 and the base station 20 for performing the processes and operations described above is described. The user equipment 10 and the base station 20 include functions for implementing the above-described embodiments. However, each of the user equipment 10 and the base station 20 may include only a part of the functions in the embodiments.

User Equipment

Figure 4:
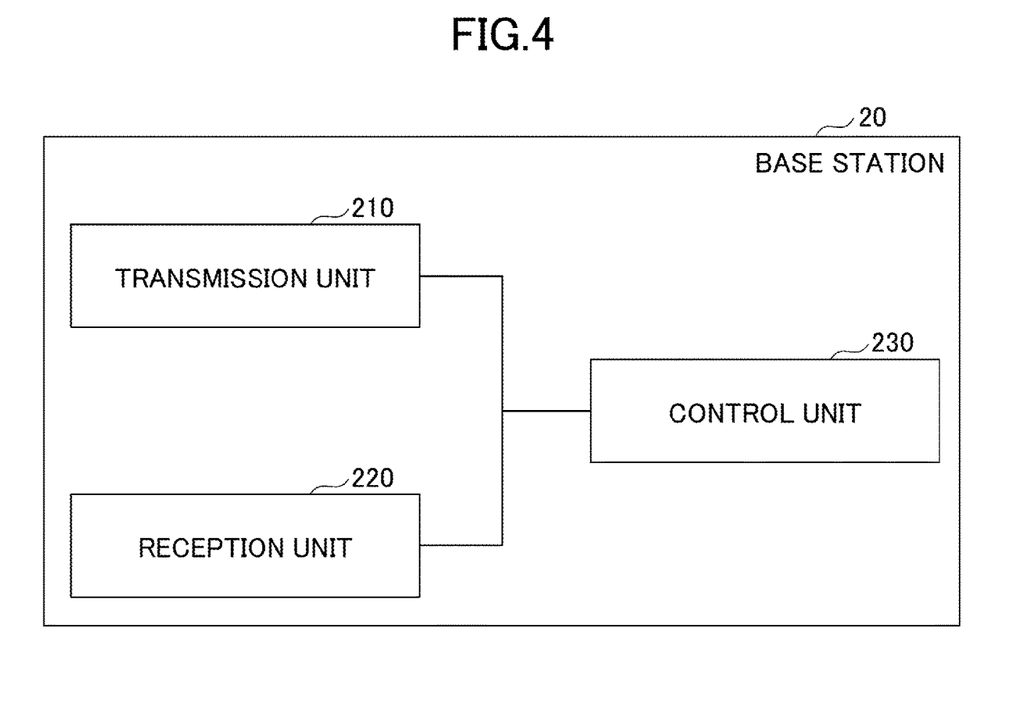
FIG. 4 is a diagram illustrating an example of a functional configuration of a base station.

FIG. 4 is a diagram illustrating an example of a functional configuration of the user equipment 10. As illustrated in FIG. 4, the user equipment 10 includes a transmission unit 110, a reception unit 120, and a control unit 130. The functional configuration illustrated in FIG. 4 is merely an example. The functional division and names of functional units may be any division and names, provided that the operation according to the embodiments of the present invention can be performed.

The transmission unit 110 creates a transmission signal from transmission data and transmits the transmission signal through radio. The reception unit 120 receives various types of signals wirelessly and obtains higher layer signals from the received physical layer signals. Furthermore, the reception unit 120 includes a measurement unit that measures a received signal to obtain received power, or the like.

The control unit 130 controls the user equipment 10. The function of the control unit 130 related to transmission may be included in the transmission unit 110, and the function of the control unit 130 related to reception may be included in the reception unit 120.

In the user equipment 10, for example, the control unit 130 stores one or more band combinations related to the CA supported by the user equipment 10. Furthermore, the control unit 130 stores, for each band combination, a combination of the maximum numbers of MIMO layers supported by the user equipment 10. For example, the transmission unit 110 transmits a specific band combination related to the CA supported by the user equipment 10 and a combination of the maximum numbers of MIMO layers supported by the user equipment 10.

Furthermore, for example, when the reception unit 120 does not receive signaling of the maximum numbers of MIMO layers to be applied to respective CCs from the base station 20 even after a predetermined time period elapses from transmitting, by the transmission unit 110, the specific band combination for the CA supported by the user equipment 10 and the combinations of the maximum numbers of MIMO layers supported by the user equipment 10, for example, the control unit 130 configures, for each CC, the minimum number of MIMO layers from among the numbers of MIMO layers configured for the CC in the combinations of the supported numbers of MIMO layers, as the maximum number of MIMO layers to be configured for the CC. In another example, the control unit 130 may set the maximum number of MIMO layers to be configured for each CC to 1 layer.

Base Station 20

FIG. 4 is a diagram illustrating an example of a functional configuration of the base station 20. As illustrated in FIG. 4, the base station 20 includes a transmission unit 210, a reception unit 220, and a control unit 230. The functional configuration illustrated in FIG. 4 is only one example. The function division and the names of the functional units may be any division and names, provided that the operation according to the embodiment can be implemented.

The transmission unit 210 includes a function for generating a signal to be transmitted to the user equipment 10 and transmitting the signal through radio. The reception unit 220 includes a function for receiving various signals transmitted from the user equipment 10 and obtaining, for example, information of a higher layer from the received signals. The reception unit 220 includes a measurement unit that measures a received signal to obtain received power, or the like.

The control unit 230 controls the base station 20. The function of the control unit 230 related to transmission may be included in the transmission unit 210, and the function of the control unit 230 related to reception may be included in the reception unit 220.

In the base station 20, for example, the reception unit 220 may receive information related to CA supported by the user equipment 10 as UE capability.

Hardware Configuration

Figure 3:
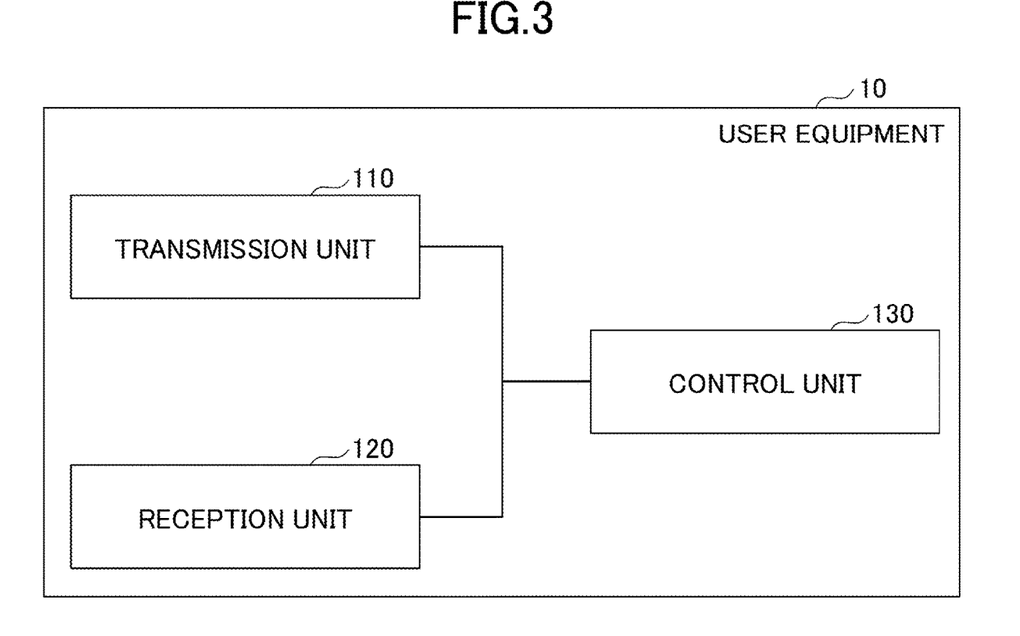
FIG. 3 is a diagram illustrating an example of a functional configuration of a user equipment.

The block diagrams (FIG. 3 to FIG. 4) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with one or more of the above-described devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit may be referred to as a transmitting unit or a transmitter. In either case, as described above, the implementation method is not particularly limited.

Figure 5:
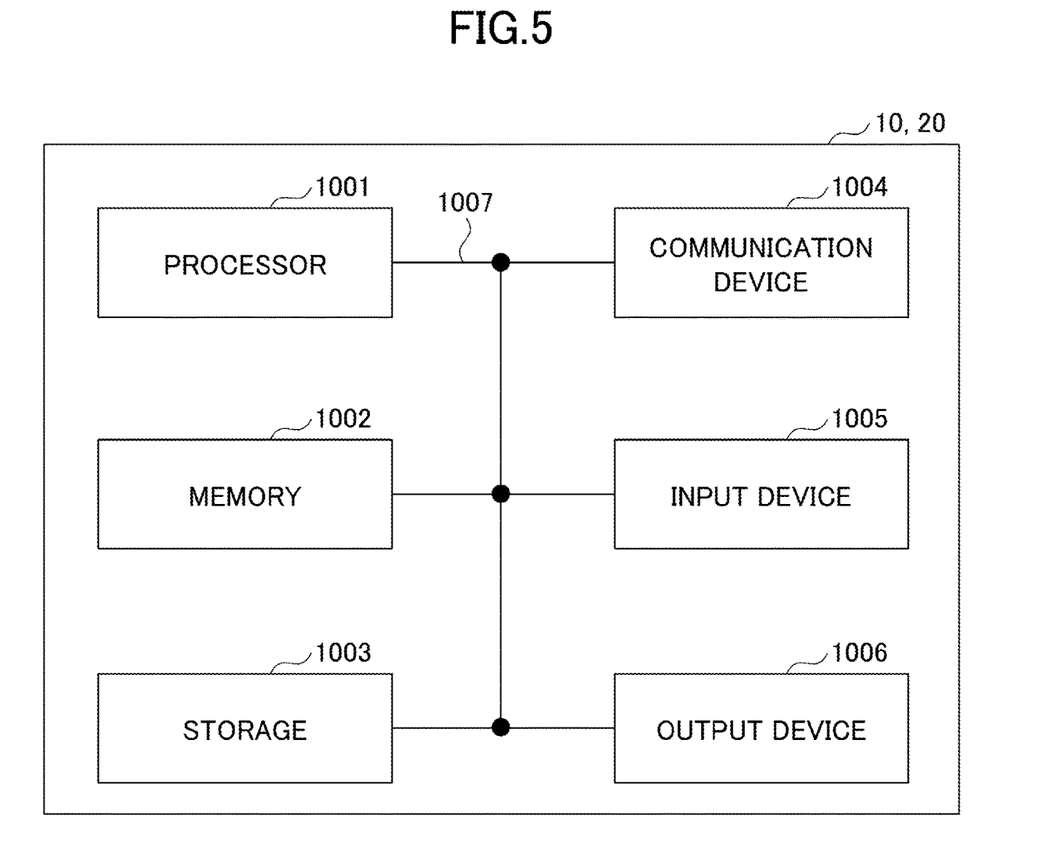
FIG. 5 is a diagram illustrating an example of a hardware configuration of the user equipment and the base station.

For example, the user equipment 10 and the base station 20 according to an embodiment of the present invention may function as a computer that performs processing according to the present embodiment. FIG. 5 is a diagram illustrating an example of a hardware configuration of the user equipment 10 and the base station 20 according to the present embodiment. The user equipment 10 and the base station 20 may each be configured as a computer device including, physically, a processor 1001, memory 1002, a storage 1003, a communication device 1004, an input device 1005, an output device 1006, a bus 1007, and so forth.

In the following description, the term "device" can be replaced with a circuit, a device, a unit, and so forth. The hardware configuration of the user equipment 10 and base station 20 may be configured to include one or more of the devices denoted by 1001-1006 in the figure, or may be configured without some devices.

Each function of the user equipment 10 and the base station 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and so forth. For example, the above-described baseband signal processor 104, the call processor 105, and the like may be implemented by the processor 1001.

Additionally, the processor 1001 reads a program (program code), a software module, data, and so forth, from at least one of the storage 1003 and the communication device 1004 to the memory 1002, and executes various processes according to these. As the program, a program is used which causes a computer to execute at least a part of the operations described in the above-described embodiment. For example, the control unit 130 of the user equipment 10 may be implemented by a control program that is stored in the memory 1002 and that is operated by the processor 1001, and other functional blocks may be similarly implemented. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), Electrically Erasable Programmable ROM (EEPROM), a Random Access Memory (RAM), and so forth. The memory 1002 may be referred to as a register, a cache, a main memory (main storage device), and so forth. The memory 1002 may store a program (program code), a software module, and so forth, which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and so forth. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, and so forth. The communication device 1004 may be configured to include, for example, a high frequency switch, a duplexer, a filter, a frequency synthesizer, and so forth, to implement at least one of frequency division duplex (FDD: Frequency Division Duplex) and time division duplex (TDD: Time Division Duplex). For example, the above-described transmission unit 110, the reception unit 120, and the like may be implemented by the communication device 1004. Furthermore, the transmission unit 110 and the reception unit 120 may be implemented so that the transmission unit 110 and the reception unit 120 are physically or logically separated.

The input device 1005 is an input device (e.g., a keyboard, a mouse, a microphone, a switch, a button, a sensor) that receives an external input. The output device 1006 is an output device (e.g., a display, speaker, LED lamp) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

The user equipment 10 and base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

In this specification, at least, a user equipment and a communication method described below are disclosed.

A user equipment including a transmission unit that transmits, to a base station, information indicating a specific band combination supported by the user equipment for carrier aggregation and combinations of maximum numbers of multiple-input and multiple-output (MIMO) layers to be applied to respective component carriers of frequency bands included in the specific band combination, the combinations of the maximum numbers of MIMO layers being supported by the user equipment; and a control unit that applies a default value as the maximum numbers of MIMO layers to be applied, by the user equipment, to the respective component carriers of the frequency bands included in the specific band combination, when a signal indicating the maximum numbers of MIMO layers to be applied, by the base station, to the respective component carriers of the frequency bands included in the specific band combination is not received from the base station.

According to the above-described configuration, when the base station does not signal the maximum numbers of MIMO layers to be applied to the respective CCs, the user equipment can configure the default value as the maximum numbers of MIMO layers to be applied, by the user equipment, to the respective CCs. As another operation in a case in which the user equipment fails to receive signalling of the maximum numbers of MIMO layers to be applied to respective CCs from the base station 20, an operation has been specified in which the user equipment determines that the RRC Reconfiguration failure occurs and the user equipment performs processing of reconnection to the base station. However, in this operation, the user equipment performs processing of reconnection, and, thus, the communication between the user equipment and the base station 20 is disconnected temporarily. In contrast, according to the above-described configuration, the communication between the user equipment and the base station can be prevented from being disconnected.

The control unit may configure a minimum number of MIMO layers from among the maximum numbers of MIMO layers configured for the respective component carriers of the frequency bands in the combinations of the maximum numbers of MIMO layers, as a default value for the maximum number of MIMO layers to be applied, by the user equipment, to each component carrier of the frequency bands included in the specific band combination. According to this configuration, when the base station does not signal the maximum numbers of MIMO layers to be applied to the respective CCs, the user equipment can configure, for each CC, the minimum number of MIMO layers from among the supported numbers of MIMO layers, as the default value. Accordingly, the amount of power consumption in the user equipment can be reduced. Furthermore, disconnection of the communication between the user equipment and the base station caused by performing processing of reconnection can be prevented.

The control unit may configure 1 layer, as a default value for the maximum number of MIMO layers to be applied, by the user equipment, to each component carrier of the frequency bands included in the specific band combination. According to this configuration, when the base station does not signal the maximum numbers of MIMO layers to be applied to the respective CCs, the user equipment can configure, for each CC, 1 layer, as the maximum number of MIMO layers to be applied by the user equipment. Accordingly, the amount of power consumption in the user equipment can be reduced. Furthermore, disconnection of the communication between the user equipment and the base station caused by performing processing of reconnection can be prevented.

When the signal indicating the maximum numbers of MIMO layers to be applied, by the base station, to the respective component carriers of the frequency bands included in the specific band combination is not received from the base station in a predetermined time period, the control unit may apply the default value, as the maximum numbers of MIMO layers to be applied, by the user equipment, to the respective component carriers of the frequency bands included in the specific band combination. According to this configuration, disconnection of the communication between the user equipment and the base station caused by performing processing of reconnection can be prevented.

A communication method executed by a user equipment, the method including transmitting, to a base station, information indicating a specific band combination supported by the user equipment for carrier aggregation and combinations of maximum numbers of Multiple-input and multiple-output (MIMO) layers to be applied to respective component carriers of frequency bands included in the specific band combination, the combinations of the maximum numbers of MIMO layers being supported by the user equipment; and applying a default value as the maximum numbers of MIMO layers to be applied, by the user equipment, to the respective component carriers of the frequency bands included in the specific band combination, when a signal indicating the maximum numbers of MIMO layers to be applied, by the base station, to the respective component carriers of the frequency bands included in the specific band combination is not received from the base station.

According to the above-described configuration, when the base station does not signal the maximum numbers of MIMO layers to be applied to the respective CCs, the user equipment can configure the default value as the maximum numbers of MIMO layers to be applied, by the user equipment, to the respective CCs. As another operation in a case in which the user equipment fails to receive signalling of the maximum numbers of MIMO layers to be applied to respective CCs from the base station 20, an operation has been specified in which the user equipment determines that the RRC Reconfiguration failure occurs and the user equipment performs processing of reconnection to the base station. However, in this operation, the user equipment performs processing of reconnection, and, thus, the communication between the user equipment and the base station 20 is disconnected temporarily. In contrast, according to the above-described configuration, the communication between the user equipment and the base station can be prevented from being disconnected.

Supplemental Embodiments

While the embodiments of the present invention are described above, the disclosed invention is not limited to the embodiments, and those skilled in the art will appreciate various alterations, modifications, alternatives, substitutions, and so forth. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no inconsistency. For the convenience of the description of the process, the user equipment 10 and the base station 20 are described using functional block diagrams, but such devices may be implemented in hardware, software, or a combination thereof. Software operated by a processor included in the user equipment 10 in accordance with embodiments of the present invention and software operated by a processor included in the base station 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, and so forth.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and so forth of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by base station 20 may be performed by an upper node in some cases. It is apparent that in a network consisting of one or more network nodes having base stations 20, various operations performed for communicating with a terminal may be performed by at least one of the base stations 20 and network nodes other than the base stations 20 (e.g., MME or S-GW can be considered, however, the network node is not limited to these). The case is exemplified above in which there is one network node other than the base station 20. However, the network node other than the base station 20 may be a combination of multiple other network nodes (e.g., MME and S-GW).

Input and output information or the like may be stored in a specific location (e.g., memory) or managed using management tables. Input and output information or the like may be overwritten, updated, or added. Output information or the like may be deleted. The input information or the like may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched along with execution. Notice of a given information (e.g. "X" notice) may also be given by implication (e.g. "no notice of the given information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, and so forth may also be transmitted and received via a transmission medium. For example, when software is transmitted from a website, server, or other remote source using at least one of wireline technology (such as coaxial cable, fiber optic cable, twisted pair, digital subscriber line (DSL: Digital Subscriber Line)) and wireless technology (infrared, microwave, and so forth), at least one of these wireline technology and wireless technology is included within the definition of a transmission medium.

The information, signals, and so forth described in this disclosure may be represented using any of a variety of different techniques. For example, data, instructions, commands, information, signals, bits, symbols, chips, and so forth, which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH, PDCCH) and information elements can be identified by any suitable name, the various names assigned to these various channels and information elements are not in any way limiting.

In this disclosure, the terms "Base Station (BS: Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and so forth may be used interchangeably. The base stations may be referred to in terms such as macro-cell, small-cell, femto-cell, pico-cell, and so forth.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," "terminal," and so forth may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, and so forth. At least one of a base station and a mobile station may be a device installed in a mobile body, a mobile body itself, or the like. The mobile body may be a vehicle (e.g., a car, an airplane), an unmanned mobile (e.g., a drone, an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between base stations and user terminals is replaced with communication between multiple user terminals (e.g., may be referred to as Device-to-Device (D2D), Vehicle-to-Everything (V2X)). In this case, a configuration may be such that the above-described function of the base station 20 is included in the user equipment 10. The terms "up" and "down" may also be replaced with the terms corresponding to the inter-terminal communication (e.g., "side"). For example, an uplink channel, a downlink channel, or the like may be replaced with a sidelink channel. Similarly, the user terminal in the present disclosure may be replaced with the base station. In this case, a configuration may be such that the above-described function of the user equipment 10 is included in the base station 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access." As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the standards applied.

As used in this disclosure, the expression "based on" does not mean "based on only" unless otherwise specified. In other words, the expression "based on" means both "based on only" and "at least based on."

When the terms "include", "including" and variations thereof are used in the present disclosure, these terms are intended to be comprehensive, similar to the term "comprising." Moreover, the term "or" as used in this disclosure is not intended to be an exclusive-OR.

In the present disclosure, where an article is added by translation, for example, "a," "an," and "the" of English, the disclosure may include that the noun following these articles is plural.

In this disclosure, the term "A and B are different" may mean "A and B are different from each other." Note that the term may mean "A and B are different from C." Terms such as "separated" or "combined" may be interpreted similar to "different."

While the present invention is described in detail above, those skilled in the art will appreciate that the invention is not limited to the embodiments described herein. The present invention may be implemented as modifications and variations without departing from the gist and scope of the present invention as defined by the scope of the claims. Accordingly, the description herein is merely illustrative and is not intended to restrict the scope of the present invention.

LIST OF REFERENCE SYMBOLS 110 transmission unit
120 reception unit
130 control unit
210 transmission unit
220 reception unit
230 control unit
1001 processor
1002 memory
1003 storage
1004 communication device
1005 input device
1006 output device

The invention claimed is:

1. A terminal comprising:
a transmission unit that transmits, to a base station, information including a band combination for carrier aggregation and a maximum number of Multiple-input and multiple-output (MIMO) layers applicable to at least one component carrier included in the band combination; and
a control unit that applies a specific value as the maximum number of MIMO layers to be applied to a specific component carrier included in the band combination, when a parameter indicating the maximum number of MIMO layers to be applied to the specific component carrier is not received from the base station.

2. The terminal of claim 1, wherein the control unit sets a minimum number of MIMO layers as the specific value.

3. The terminal of claim 1, wherein the control unit sets one layer as the specific value.

4. A communication method by a terminal, the method comprising:
transmitting, to a base station, information including a band combination for carrier aggregation and a maximum number of Multiple-input and multiple-output (MIMO) layers applicable to at least one component carrier included in the band combination; and
applying a specific value as the maximum number of MIMO layers to be applied to a specific component carrier included in the band combination, when a parameter indicating the maximum number of MIMO layers to be applied to the specific component carrier is not received from the base station.

5. A radio communication system comprising:
a base station; and
a terminal,
wherein the base station includes
a reception unit that receives, from the terminal, information including a band combination for carrier aggregation and a maximum number of Multiple-input and multiple-output (MIMO) layers applicable to at least one component carrier included in the band combination,
wherein the terminal includes
a transmission unit that transmits the information to the base station; and
a control unit that applies a specific value as the maximum number of MIMO layers to be applied to a specific component carrier included in the band combination, when a parameter indicating the maximum number of MIMO layers to be applied to the specific component carrier is not received from the base station.

* * * * *